United States Patent [19]

Mallon et al.

[11] Patent Number: 5,725,779
[45] Date of Patent: *Mar. 10, 1998

[54] ANIONIC WATER-SOLUBLE POLYMER PRECIPITATION IN SALT SOLUTION

[75] Inventors: Joseph J. Mallon, Danbury; Raymond S. Farinato, Norwalk, both of Conn.; Louis Rosati, South Salem; John J. Freeman, Jr., Valhalla, both of N.Y.

[73] Assignee: Cytec Technology Corp., Wilmington, Del.

[21] Appl. No.: 723,628

[22] Filed: Oct. 3, 1996

[*] Notice: The term of this patent shall not extend beyond the expiration date of Pat. No. 5,738,794.

[51] Int. Cl.$^6$ .................................................. C02F 1/54
[52] U.S. Cl. ........................ 210/728; 210/734; 210/928
[58] Field of Search ................................. 210/725, 728, 210/729, 732, 928, 734

[56] References Cited

U.S. PATENT DOCUMENTS

| | | |
|---|---|---|
| 3,336,270 | 8/1967 | Monagle . |
| 3,493,500 | 2/1970 | Volk et al. .................... 210/54 |
| 3,578,587 | 5/1971 | Kemmer ........................ 210/728 |
| 3,658,772 | 4/1972 | Volk et al. ................... 260/80.3 N |
| 3,692,673 | 9/1972 | Hoke ............................. 210/728 |
| 3,891,607 | 6/1975 | Kuhn et al. ................... 260/80.3 N |
| 4,224,149 | 9/1980 | Balcerski et al. ............. 210/728 |
| 4,380,600 | 4/1983 | Hosoda et al. ................ 524/458 |
| 4,525,515 | 6/1985 | Peignier et al. ............... 210/728 |
| 4,549,967 | 10/1985 | Branning ...................... 210/728 |
| 4,711,727 | 12/1987 | Matthews et al. ............. 210/728 |
| 4,956,092 | 9/1990 | Blum ............................. 210/726 |
| 5,154,857 | 10/1992 | Durrieu et al. ................ 210/708 |
| 5,403,883 | 4/1995 | Messner et al. ............... 524/458 |

FOREIGN PATENT DOCUMENTS

| | | |
|---|---|---|
| 0 183 466 B1 | 11/1985 | European Pat. Off. . |
| 14907 | 1/1968 | Japan . |

OTHER PUBLICATIONS

Quarterly Review of Biophysics (Great Britain) 18, 4 (1985), Kim D. Collins & Michael W. Washabaugh, "The Hofmeister effect and the behaviour of water at interfaces", pp. 323–422.

Colloids and Surfaces, 19 (1986) (Netherlands), E.D. Goddard, "Polymer–Surfactant Interaction Part II. Polymer and Surfactant of Opposite Charge," pp. 301–329.

ACS Symposium Series 578 (American Chemical Society, Washington, DC 1994), "Structure and Flow in Surfactant Solutions, Chapter 23, Yingjie Li and Paul L. Dubin," Polymer–Surfactant Complexes, pp. 321–336.

*Primary Examiner*—Peter A. Hruskoci
*Assistant Examiner*—Betsey J. Morrison
*Attorney, Agent, or Firm*—Claire M. Schultz; Joseph J. Mallon

[57] ABSTRACT

Compositions of precipitated anionic polymers containing mixtures of certain salts as well as processes for making and using the same are disclosed.

10 Claims, No Drawings

ANIONIC WATER-SOLUBLE POLYMER PRECIPITATION IN SALT SOLUTION

FIELD OF THE INVENTION

This invention relates generally to aqueous compositions of certain salts which contain precipitated anionic water-soluble polymers, methods for precipitating anionic water-soluble polymers in aqueous solutions containing certain salts, methods for polymerizing monomers in aqueous solutions containing certain salts to form precipitated anionic water-soluble polymers, optionally precipitated as polymer dispersions, and methods for using compositions of precipitated anionic water-soluble polymers in aqueous solutions of certain salts for various applications e.g. papermaking, mining, wastewater treatment, and soil conditioning.

BACKGROUND OF THE INVENTION

High molecular weight water-soluble anionic polymers are useful in a number of applications e.g. the flocculation of suspended solids, recovery of minerals from mining operations, coal refuse dewatering, papermaking, paper sludge deinking, enhanced oil recovery, wastewater treatment, soil conditioning, etc. In many cases, the anionic polyelectrolytes are supplied to the user in the form of substantially dry polymer granules. The granules may be manufactured by the polymerization of water-soluble monomers in water to form a water-soluble polymer solution, followed by dehydration and grinding to form water-soluble polymer granules.

Another means for isolating the polymer from the polymer solution is to precipitate the polymer by mixing the polymer solution with an organic solvent e.g. acetone or methanol that is a non-solvent for the polymer, then isolating the polymer by evaporation or filtration. However, in many cases, this method is inconvenient, expensive and dangerous because of the problem of handling large amounts of flammable organic solvent.

Water-soluble anionic polymers may also be supplied in the form of a water-in-oil emulsion or microemulsion, wherein the polymer solution droplets are isolated from each other by the continuous oil phase. The polymer emulsions may be utilized directly in the desired application, or by diluting into water in the presence of a "breaker" surfactant. Although this mode of supply is convenient and may avoid the need for dehydration, the oil may be expensive and is often flammable; in addition, the oil may also present a secondary pollution problem. Alternatively, the emulsion may be precipitated into an organic liquid that is a solvent for the water and oil, but a non-solvent for the polymer, followed by isolation and drying to recover the substantially dry polymer. However, these precipitation methods may be disadvantageous for the same reasons mentioned above.

Processes for preparing water-soluble polymers in the form of unswollen, hard, nontacky granules are described in U.S. Pat. No. 3,336,270. The water-soluble polymers were prepared by dissolving acrylamide-type monomers in tertiary butanol-water mixtures and allowing the monomer to polymerize to give polymers which precipitated out of the tertiary butanol-water mixture.

A first water-soluble polymer may also be dispersed in the presence of a second water-soluble polymer to form aqueous polymer dispersions, as taught in U.S. Pat. Nos. 4,380,600 and 5,403,883. Since the two polymers do not dissolve each other, the first water-soluble polymer reportedly forms small globules which disperse in the solution of the second water-soluble polymer. Optionally, salt may be added to improve the flowability.

U.S. Pat. No. 3,891,607 disclosed thermoreversible coacervates that were produced by copolymerizing from 30 to 50 mole percent of acrylic acid and from 70 to 30 mole percent of acrylamide in aqueous solution, lowering the pH to below 3.3 and adjusting the temperature to below the coacervate transition temperature.

U.S. Pat. No. 3,658,772 describes a process for the copolymerization of acrylic acid in a salt solution containing 0.1 to 10 percent salt, by weight, based on total weight, to form a polymerizate in the form of a fluid suspension of disperse, solid-polymer particles. Hereinbelow, all concentrations, unless otherwise noted, are expressed as weight percent of total weight. Significantly, the pH of the polymerization was in the range of 1 to 3.2, and it was reported that increasing the pH to 4 and above resulted in non-fluid, gel polymerizates, apparently because of the increased solubility of the salt form of acrylic acid at higher pH. In U.S. Pat. No. 3,493,500; the pH range was increased to as high as 4 by including a cationic water-soluble polymer in the formulation in an amount of about 0.03 to 0.2 part per part by weight of acrylic acid polymer solids. However, in neither case were fluid suspensions obtained at pH values higher than 4.

Japanese Patent Publication No. 14907/1971 discloses a method for the copolymerization of acrylic acid and acrylamide in salt solutions to form a flowable polymerizate. The copolymerization was conducted at a pH of 1 to 4 in the presence of 0.1–60 wt % inorganic salt. In several systems containing 90/10 acrylic acid and acrylamide and 50/50 acrylic acid and acrylamide, if the pH of the polymerization system was increased to 4 or more, nonflowable gel polymerizates were produced. The homopolymer of acrylic acid could be manufactured as a "suspended compound" at a pH of 4 or slightly higher.

Aqueous dispersions of anionic polymers which are precipitated in salt solutions at low pH are generally utilized by diluting the dispersion into water so that the salt concentration is greatly reduced. At low salt concentrations, the anionic polymers become more soluble and hence dissolve. However, the rate of dissolution tends to be a function of pH, so that if the dispersions are diluted into acidic water, the polymer dissolves at a disadvantageously slow rate, frequently necessitating addition of base to raise the pH and increase the dissolution rate. Therefore, for practical reasons, it is desirable for the pH of the polymer dispersion to be higher than 4 so that pH adjustment of the dilution water is unnecessary.

The effect of salts on the solubility of various substances in aqueous solution is well discussed in the scientific literature e.g., Kim D. Collins and Michael W. Washabaugh, Q. Rev. Biophys., Vol. 18(4) pp. 323–422, 1985. "Kosmotropic" salts tend to reduce the solubility of substances in aqueous solution. There are numerous means known to those skilled in the art for determining whether a particular salt is kosmotropic. Representative salts which contain anions such as sulfate, fluoride, phosphate, acetate, citrate, tartrate and hydrogenphosphate are kosmotropic. Some salts are more kosmotropic than others, based on the well known "Hofmeister series" principles.

The use of salts to precipitate anionic polymers is also taught in EP 183 466 B1. This invention provides a method of obtaining a dispersion of a water-soluble polymer by dissolving a monomer in an aqueous salt solution and conducting polymerization while depositing the polymer as fine particles in the presence of a dispersant. The aqueous salt solution is required to dissolve the monomer and precipitate the polymer. As the dispersant, a polymer electrolyte and/or a polymer soluble in an aqueous salt solution is/are effective. Where the deposited polymer is an anionic or cationic polymer electrolyte, the polymer electrolyte used as the dispersant is required to have charges of the same kind as the deposited polymer. Representative salts include sodium sulfate, ammonium sulfate, and other strongly kosmotropic salts. For polymers whose anionicity is derived from the presence of sulfonate groups e.g. polymers and copolymers of poly(2-acrylamido-2-methyl-propanesulfonate), herein poly(AMMPS), the polymer is difficult to precipitate even at low pH and high levels of kosmotropic salt.

The precipitation of anionic polymers by cationic organic salts, e.g. surfactants, is well known. A review by E. D. Goddard (Colloids and Surfaces, Vol. 19 pp 301–329, 1986), is hereby incorporated herein by reference. The precipitation phenomenon is reportedly controlled by the relative concentrations of the anionic polymer and cationic organic salt, as well as by the size of the organic portion of the anionic organic salt and by the type of polymer. Anionic polymer precipitation tends to occur when the oppositely charged cationic organic salt binds to the polymer and neutralizes the charge. The prevailing view has been that the addition of salt weakens the binding, making precipitation more difficult.

For instance, the effect of added sodium chloride is discussed on p. 313 of the review by E. D. Goddard, cited above, wherein the author states that "adding salt . . . substantially reduces the affinity of binding as seen by a steady increase in the concentration [of surfactant] at which binding commences . . . ." A similar view was advanced by Y. Li and P. Dubin, in "Structure and Flow in Surfactant Solutions", ACS Symposium Series 578, American Chemical Society, 1994, at p. 328 where the authors state: "In order to avoid precipitation in mixtures of strong polyelectrolytes with oppositely charged [surfactant] micelles, the binding strength . . . must be reduced. Practically, several ways could be used to attenuate the strong electrostatic interaction between the polyelectrolyte and oppositely charged surfactant, such as . . . addition of salt."

Surprisingly, and contrary to the teachings cited above, it has now been found that the precipitation of many typical water-soluble anionic polymers by cationic organic salts in aqueous solution can be greatly enhanced by the addition of kosmotropic salts. Significantly, these polymers remain precipitated even at pH greater than 4. Therefore, in accordance with our invention, compositions comprised of water, at least one cationic organic salt, at least one kosmotropic salt, and at least one precipitated anionic water-soluble polymer are provided. Further, processes for precipitating water-soluble anionic polymers in compositions comprising water and one or more cationic organic salts, and one or more kosmotropic salts, are also embodied in the instant invention. Compositions in which the precipitated anionic polymer is dispersed in the form of small droplets so as to produce a polymer dispersion are preferred. These polymer dispersions remain flowable even at pH greater than 4. These polymer dispersions may be stabilized by a dispersant, which may be a water-soluble polymer, and the precipitated anionic polymer is preferably formed by polymerization of monomers in the salt solution, optionally in the presence of a dispersant.

SUMMARY OF THE INVENTION

The present invention is directed to compositions of precipitated anionic polymers in solutions of cationic organic salts and kosmotropic salts, as well as processes for making and using the same. Compositions in which the polymer is dispersed in the form of small droplets are preferred, and methods of making these polymer dispersions which may include dispersants, are taught herein. A particularly preferred method is to form the dispersed polymer by polymerization of the monomers in solutions of the salts, optionally in the presence of one or more other water-soluble polymers which may act as dispersants. Since the polymer remains insoluble even at pH greater than 4, flowable polymer dispersions are obtained which may be readily used without pH adjustment. Methods of using the compositions of the instant invention for applications such as flocculation of suspended solids, solid-liquid separations, mining, papermaking, soil stabilization, etc. are also embodied herein.

Embodiments of the instant invention include compositions comprised of water, at least one precipitated anionic water-soluble polymer, an effective amount of at least one kosmotropic salt, and an effective amount of at least one cationic organic salt; preferred embodiments include compositions comprised of water, at least one precipitated anionic water-soluble polymer, from 0.02 to 12%, by weight based on total weight, of a tetraalkylammonium salt and from 0.1% to 30%, by weight based on total weight, of a sulfate salt, wherein said precipitated anionic water-soluble polymer is comprised of recurring units that contain sulfonic acid, sulfonic acid salt, carboxylic acid, or carboxylic acid salt groups; as well as compositions in which said anionic water-soluble polymer is precipitated as a dispersion, optionally in the presence of a second water-soluble polymer.

Further embodiments include processes comprising mixing, in any order, water, at least one anionic water-soluble polymer, an effective amount of at least one kosmotropic salt, and an effective amount of at least one cationic organic salt, to form an aqueous composition comprising at least one precipitated anionic water-soluble polymer; preferred embodiments include processes comprising mixing, in any order, water, at least one anionic water-soluble polymer having recurring units containing a sulfonic acid group, sulfonic acid salt group, carboxylic acid group, or carboxylic acid salt group, from 0.02 to 12%, by weight based on total weight, of a tetraalkylammonium salt, and from 0.1% to 30%, by weight based on total weight, of a sulfate salt, to form an aqueous composition comprising at least one precipitated anionic water-soluble polymer; as well as processes in which a second water-soluble polymer is mixed in.

Other embodiments include processes comprising polymerizing at least one anionic monomer in an aqueous solution comprised of an effective amount of at least one cationic organic salt and an effective amount of at least one kosmotropic salt, to form an aqueous composition comprising at least one precipitated anionic water-soluble polymer; preferred embodiments include processes comprising polymerizing monomers that contain a sulfonic acid group, sulfonic acid salt group, carboxylic acid group, or carboxylic acid salt group, in an aqueous solution comprised of from 0.02 to 12%, by weight based on total weight, of a tetraalkylammonium salt and from 0.1% to 30%, by weight based on total weight, of a sulfate salt, to form an aqueous composition comprising at least one precipitated anionic water-soluble polymer; as well as processes in which the anionic water-soluble polymer is precipitated as a dispersion, optionally in the presence of a second water-soluble polymer.

Applications of the instant invention include processes of concentrating a dispersion of suspended solids which comprises dewatering a dispersion of suspended solids by adding to said dispersion an effective amount of an aqueous composition comprised of an effective amount of at least one cationic organic salt, an effective amount of at least one kosmotropic salt, and at least one precipitated anionic water-soluble polymer, and separating the resultant concentrated dispersion; preferred embodiments include processes of concentrating a dispersion of suspended solids which comprises dewatering a dispersion of suspended paper solids or suspended mineral solids by adding to said dispersion an effective amount of an aqueous composition comprised of a precipitated anionic water-soluble polymer, from 0.02 to 12%, by weight based on total weight, of a tetraalkylammonium salt and from 0.1% to 30%, by weight based on total weight, of a sulfate salt, and separating the resultant concentrated dispersion, wherein said precipitated anionic water-soluble polymer is comprised of recurring units that contain sulfonic acid, sulfonic acid salt, carboxylic acid or carboxylic acid salt groups. In other preferred processes, said composition is a dispersion, optionally containing a second water-soluble polymer, and is first dissolved in water before being added to said dispersion of suspended solids.

Additional applications include processes of conditioning soil which comprises adding to the soil a soil-conditioning amount of an aqueous composition comprised of an effective amount of at least one cationic organic salt, an effective amount of at least one kosmotropic salt, and at least one precipitated anionic water-soluble polymer; preferred applications include processes of conditioning soil which comprises adding to the soil an effective amount of a soil-conditioning solution made by diluting an aqueous composition comprised of precipitated anionic water-soluble polymer, from 0.02 to 12%, by weight based on total weight, of a tetraalkylammonium salt and from 0.1% to 30%, by weight based on total weight, of a sulfate salt, wherein said precipitated anionic water-soluble polymer is comprised of recurring units that contain carboxylic acid, carboxylic acid salt, sulfonic acid, or sulfonic acid salt groups.

DETAILED DESCRIPTION OF THE PREFERRED EMBODIMENTS

It has now been discovered, surprisingly, that the precipitation of anionic polymers by cationic organic salts is greatly enhanced by the addition of kosmotropic salts. For the purposes of this invention, a polymer is precipitated in a particular salt solution if the particular polymer does not dissolve to form a clear, homogeneous, solution when the particular polymer is stirred or agitated, for periods of up to about a week, in the salt solution at a particular temperature. A polymer is also considered to be precipitated when a solution of a polymer or polymers in the salt solution develops cloudiness or turbidity, when the temperature of the solution is changed. It is obvious from the foregoing that solubility of a polymer or polymers in a particular salt solution may be temperature dependent, so that a polymer may be precipitated in a particular salt solution at low temperatures, but dissolved at higher temperatures, or vice-versa. The polymer or polymers, salt or salts, and water may be mixed in any order, or the polymerization may be conducted in the presence of the salt or salts, or part of the salt or salts, in order to determine the solubility of the polymer in the salt solution. The polymer may be considered to be precipitated if all or only part, e.g. 10% or more, of the polymer is precipitated.

Those skilled in the art understand that the solubility of anionic water-soluble polymers is often determined by measuring the cloud point of the polymer in salt solution. The cloud point of a particular polymer in a particular salt solution is defined, for the purposes of this invention, as the temperature at which a substantially clear solution of the polymer becomes cloudy as it is cooled. For instance, a composition comprised of a water-soluble anionic polymer or mixture thereof, water, and salts may be heated to dissolve the polymer, forming a substantially clear solution. The solution is typically allowed to cool slowly, until the polymer begins to precipitate or phase separate and the solution becomes cloudy or turbid. The temperature at which the solution begins to become cloudy is the cloud point. The reproducibility of cloud points determined in this way is generally about ±3° C. Polymers which are less soluble have higher cloud points, and polymers which are more soluble have lower cloud points. In some cases, cloud points are difficult to measure conveniently, because the polymers are so insoluble that they cannot be solubilized by heating, even on heating to the boiling point of the salt solution. Likewise, some polymers are so soluble that they do not precipitate, even on cooling to the freezing point of the salt solution.

Occasionally, a situation is encountered in which a polymer precipitates from salt solution on heating, instead of on cooling. In these cases, the cloud point of a particular polymer in a particular salt solution is defined, for the purposes of this invention, as the temperature at which a solution of the polymer begins to become cloudy as it is heated. Hereinbelow, all cloud points were obtained on cooling, except as otherwise noted.

Alternatively, polymerization of the monomers may be conducted in the presence of the salt(s). For instance, amounts of water, monomers and salt(s) can be mixed together and subjected to polymerization conditions. Cloud points may then be determined as above. Polymerizing the monomers in the presence of the salts may be preferable, particularly at high polymer concentration or high polymer molecular weight, because of the difficulty of adequately mixing the polymer with the salt solution. This technique may also be preferable when the cloud point is above 100° C.

The kosmotropic salts useful in the instant invention can be any kosmotropic salt including sulfates, phosphates, fluorides, citrates, acetates, tartrates, and hydrogenphosphates. The counterion has a small effect on the solubility of the polymer, and may be ammonium or any alkaline or alkaline earth metal such as lithium, sodium, potassium, magnesium, calcium, etc. The counterion may also be aluminum, or may be a transition metal cation such as manganese or iron. However, it is preferred to employ kosmotropic salts having monovalent cations because of the known tendency of anionic polymers to form complexes with divalent metal ions e.g. $Ca^{+2}$. Ammonium sulfate and sodium sulfate are preferred kosmotropic salts.

Cationic organic salts with the general structure $R_n$—$M^+$ $A^-$, where R comprises ester, alkyleneoxy, alkyl, or substituted alkyl with from about 1 to about 22 carbons, or aryl or substituted aryl with from about 6 to about 22 carbons, M is an cationic group such as ammonium, including monoalkyl, dialkyl, trialkyl and tetraalkyl ammonium, and A is an anion e.g chloride, bromide, iodide, methylsulfate, etc, are useful for the precipitation of anionic polymers, particularly in the presence of kosmotropic salts. The R group may be linear or branched, and may be substituted with more than one cationic M group. The cationic M group may be substituted with more than one R group; e.g. n may range from 1 to 4.

Mixtures of cationic organic salts with each other are also useful, in admixture with kosmotropic salts. Tetraalkylammonium halides having from 4 to 22 carbon atoms, substituted tetraalkylammonium halides having from 4 to 22 carbon atoms, aryl trialkylammonium halides having from 9 to 22 carbon atoms, and substituted aryl trialkylammonium halides having from 9 to 22 carbon atoms are preferred. Cetylpyridinium chloride (CPC), cetylmethylammonium chloride (CMAC), and benzyltriethylammonium chloride (BTEAC) are most preferred.

The effective amounts of kosmotropic salt and cationic organic salt useful to cause precipitation or phase separation depend on the temperature, the inherent solubility of the polymer, the concentration of the polymer, the particular cationic organic salt used, the pH, and the particular kosmotropic salt used. The effective amount of cationic organic salt also depends on the amount of kosmotropic salt. When used without a kosmotropic salt, a greater amount of cationic organic salt is generally necessary to bring about a particular level of polymer insolubility than when a kosmotropic salt is present. The effective amounts of cationic organic salt and kosmotropic salt which will insolubilize a particular polymer are generally in the range of from about 0.01% to about 15%, preferably from about 0.02% to about 12%, most preferably from about 0.05% to about 10%, for the cationic organic salt, and from about 0.1% to about 30%, preferably from about 1% to about 28%, most preferably from about 5% to about 25%, for the kosmotropic salt. Preferably, the salts are soluble in the solution, so the upper limits to salt content are determined mainly by the capacity of the solution to dissolve the salt. The effective amounts of cationic organic salt and kosmotropic salt useful for precipitating a particular polymer may be found by routine experimentation as discussed herein.

Anionic polymers and copolymers may be precipitated over a broad range of pH by the practice of the instant invention. For instance, as illustrated in Example A, a copolymer was prepared by copolymerizing about 50 mole percent acrylamide and 50 mole percent 2-acrylamido-2-methyl-propanesulfonic acid, followed by neutralization. The resultant polymer was diluted in deionized water to form a 0.2% solution, and the solubility of the polymer was determined in various salt solutions at pH 4.6, as illustrated in Examples B, C, D, and 1. In 0.2% BTEAC, the polymer solution remained clear, but the polymer solution had a cloud point of 42° C. in 28% ammonium sulfate. However, the same polymer had a cloud point >105° C. when both 0.2% BTEAC and 28% ammonium sulfate were present. The cloud point increased because the combination of BTEAC and ammonium sulfate was more effective for precipitating the polymer than either salt alone.

Polymers useful in the practice of this invention may be any water-soluble anionic polymer, including polymers made by the polymerization and copolymerization of anionic monomers, and polymers which become anionically charged after polymerization has occurred. Polymers having recurring units which contain anionic groups such as carboxylic acids, carboxylic acid salts, sulfonic acids, sulfonic acid salts, and/or combinations thereof are preferred. These polymers are typically made by polymerizing monomers which contain anionic groups such as carboxylic acid, carboxylic acid salt, sulfonic acid, sulfonic acid salt, and/or combinations thereof. Polymers made by polymerizing acrylic acid and 2-acrylamido-2-methyl-propanesulfonic acid, and their salts, are most preferred. The mole % anionic recurring units in the polymer may range from about 1 mole % to about 100 mole %, preferably from about 2 mole % to about 90 mole %, more preferably from about 5 mole % to about 70 mole %, most preferably from about 8 mole % to about 50 mole %, based on the total moles of recurring units in the polymer.

Anionic copolymers may also be prepared by copolymerizing anionic monomers with other anionic comonomers, nonionic comonomers, and/or cationic comonomers. Anionic monomers may include acrylic acid, methacrylic acid, vinyl sulfate, 2-acrylamido-2-methylpropane sulfonic acid, styrene sulfonic acid, their salts and the like. Polymers which become anionically charged after polymerization include polymers made by hydrolyzing cellulose, polymers made by hydrolyzing and/or hydroxamating polyacrylamide, and polymers made from maleic anhydride.

The instant invention is particularly useful for precipitating polymers having 15 mole % or more AMMPS units, based on the total moles of recurring units in the polymer, because these polymers are difficult to precipitate in aqueous salt solutions that do not contain cationic organic salts. For instance, copolymers of acrylamide and AMMPS, wherein the mole % AMMPS used to make the polymer is greater than 15%, are easily precipitated, according to the instant invention, in a mixture of BTEAC and $(NH_4)_2SO_4$.

Nonionic monomers may include substantially water-soluble monomers such as acrylamide, methacrylamide, and N-isopropylacrylamide, or monomers which are sparingly soluble in water such as t-butylacrylamide, N,N-dialkylacrylamide, diacetone acrylamide, ethyl acrylate, methyl methacrylate, methyl acrylate, styrene, butadiene, ethyl methacrylate, alkyl(meth)acrylate esters, acrylonitrile, etc. and the like. Nonionic monomers may also include monomers which become charged at low pH, such as dialkylaminoalkyl(alk)acrylates, including dimethylaminoethylacrylate, diethylaminoethylacrylate, dimethylaminoethylmethacrylate, diethylaminoethylmethacrylate and corresponding acrylamide derivatives such as methacrylamidopropyldimethylamine. Preferred nonionic monomers are acrylamide, t-butyl acrylamide, methacrylamide, methyl methacrylate, ethyl acrylate, acrylonitrile, and styrene.

Cationic monomers include salts of dialkylaminoalkyl (alk)acrylates such as the salts of dimethylaminoethylacrylate, dimethylaminoethylmethacrylate, diethylaminoethylacrylate, diethylaminoethylmethacrylate and the salts of corresponding acrylamide derivatives such as methacrylamidopropyldimethylamine, and other cationic monomers such as diallydimethylammonium chloride, diallydiethylammonium chloride, etc. On a mole basis, the polymer must contain fewer cationic recurring units than anionic recurring units so that the polymer, although ampholytic, retains a net negative charge. Preferably, the polymer contains less than 10 mole % cationic recurring units, based on the total number of moles of recurring units in the polymer.

Mixtures of one or more polymers may be precipitated by the practice of this invention. The polymers may be mixed together before, during or after being mixed with part or all of the salt solution. Mixtures of polymers may be separated from each other by utilizing a salt solution that tends to precipitate one or more polymers in the mixture, but is a solvent for one or more other polymers in the mixture. Additional salts may be added before, during or after the precipitation process. A polymer or polymer may also be formed by polymerization of the monomers in the presence of another polymer or polymers, which themselves may be either precipitated or soluble in the salt solution.

Polymerization of the monomers may be carried out in any manner known to those skilled in the art, including solution, bulk, precipitation, dispersion, suspension, emulsion, microemulsion, etc. Polymerization of the monomers may be carried out in the presence of part or all of the salt solution. Initiation may be effected with a variety of thermal and redox free radical initiators, including peroxides, e.g. t-butyl peroxide; azo compounds, e.g. azoisobisbutyronitrile; inorganic compounds, such as potassium persulfate and redox couples, such as ferrous ammonium sulfate/ammonium persulfate and sodium bromate/sulfur dioxide. Initiator addition may be effected any time prior to the actual initiation per se. Polymerization may also be effected by photochemical irradiation processes, such as by ultraviolet irradiation or by ionizing irradiation from a cobalt 60 source. The monomers may all be present when polymerization is initiated, or part of the monomers may be added at a later stage of the polymerization. Polymerization may be conducted in multiple stages. Additional materials such as pH adjusting agents, stabilizers, chelating agents, sequestrants, etc. may also be added before, during or after polymerization.

The molecular weights of the polymers which are precipitated or phase separated by the practice of this invention are not particularly critical. The weight average molecular weights of the polymers may range from about 1,000 to about 100,000,000, preferably from about 100,000 to about 75,000,000, more preferably from about 1,000,000 to about 60,000,000. The concentration of the polymer in the composition may range from 0.01% to 90%, or occasionally even higher. It is generally preferred, for practical reasons such as the desire to keep production and shipping costs relatively low, for the level of polymer in the compositions to be as high as possible.

Compositions of the salt solutions, useful for precipitating anionic polymers, may be prepared by simply dissolving the desired salts in water, preferably with agitation. Waters useful in the practice of this invention are not particularly critical and can be from any source of water e.g. distilled water, tap water, recycled water, process water, well water, etc. However, care should be taken to avoid waters having high concentrations of divalent cations such as $Ca^{+2}$ that are known to form complexes with anionic polymers. Precipitation of the anionic polymer in the salt solution may be carried out by mixing, in any order, the salt solution and the polymer solution or polymer emulsion. Substantially dry polymer granules of water-soluble polymer may be added to the salt solutions to form compositions comprising salts, water and precipitated polymer. Alternatively, the anionic water-soluble polymer may be formed by polymerization of the monomers in the presence of the salts. All or part of the polymer may be precipitated.

It is preferred to polymerize monomers in a salt solution to form a polymer dispersion. For the purposes of this invention, precipitated polymer is a polymer dispersion if some or all of the precipitated polymer is in the form of small droplets that are dispersed in the aqueous salt solution. The precipitated polymer droplets may contain salt and water. Some or all of the polymer may be precipitated. The droplet size may be in the range of from about 0.05 micron to about 1 millimeter, preferably from about 0.08 micron to about 100 microns, more preferably from about 0.1 micron to about 25 microns, and most preferably from about 0.15 micron to about 15 microns. As above, the monomer or monomers and salt or salts may be added in stages during the polymerization or may all be present at the start. Initiation of polymerization may be conducted in any manner, as described hereinabove.

The dispersed polymer droplets may tend to settle on standing. Surprisingly, it has been found that certain water soluble polymers, referred to herein as dispersants, tend to aid in droplet formation and also tend to stabilize the droplets against settling. The polymer dispersant stabilizes the polymer dispersion, but does not cause the anionic water-soluble polymer to be precipitated. As discussed above, the salt combination causes the anionic water-soluble polymer to be precipitated. It has been found that polymers such as poly(AMMPS), polyacrylamide, and copolymers of acrylamide with amounts of cationic, nonionic and anionic monomers decrease the settling rate of polymer dispersions. Without dispersant, the polymer droplets tend to settle with time and may merge to form a layer that is separate from the aqueous phase. However, when the same polymerization is conducted in the presence of water-soluble polymers e.g poly(AMMPS), polyacrylamide, or copolymers of acrylamide with amounts of cationic, anionic or nonionic monomers, the rate of settling is advantageously reduced and superior polymer dispersions are obtained.

Polymers useful as dispersants may include polyacrylamide and other nonionic polymers, e.g. poly (methacrylamide), poly(vinyl alcohol), poly(ethylene oxide), etc. and the like. Preferred dispersants are anionic polymers such as poly(acrylic acid), poly(AMMPS), copolymers of acrylic acid with acrylamide, and copolymers of AMMPS with acrylamide. Preferably, dispersants are soluble or mostly soluble in the particular salt solution. It is generally preferable for the dispersant to have greater solubility in the particular salt solution than the precipitated polymer droplets which are being dispersed. Copolymers useful as dispersants may include copolymers of nonionic monomers e.g. acrylamide with up to about 20 mole %, preferably from about 5 to about 15 mole % of a cationic comonomer, e.g. quaternary salts of dialkylaminoalkyl(alk) acrylate, diallyldialkylammonium halide, etc., based on the total moles of recurring units in the polymer. Other copolymers useful as dispersants include copolymers of acrylamide with up to about 99 mole % of an anionic comonomer such as sodium 2-acrylamido-2-methylpropane sulfonic acid, preferably from about 5 to about 95 mole % comonomer, most preferably from about 25 to about 75 mole % comonomer, based on the total moles of recurring units in the polymer. Anionic monomers may include acrylic acid, styrene sulfonic acid, their salts and the like. Nonionic comonomers may include substantially water-soluble monomers such as methacrylamide, or monomers which are sparingly soluble in water such as t-butylacrylamide, diacetone acrylamide, ethyl acrylate, methyl methacrylate, methyl acrylate, styrene, butadiene, ethyl methacrylate, acrylonitrile, etc. and the like. Preferred nonionic monomers are acrylamide, t-butyl acrylamide, methacrylamide, methyl methacrylate, ethyl acrylate and styrene.

Dispersants are generally used in amounts ranging up to about 25%, preferably about 1% to about 20%, more preferably about 5% to about 15%, based on the total weight of the precipitated anionic polymer droplets being dispersed. The dispersant is not used in amounts which cause the precipitation of the anionic polymer in the absence of cationic organic salts and kosmotropic salts. The weight average molecular weights of the dispersant polymers may range from about 1,000 to about 50,000,000, preferably from about 50,000 to about 10,000,000, more preferably from about 100,000 to about 5,000,000.

Anionic polymers may be precipitated over a broad range of pH by the practice of the instant invention, as illustrated in Examples 1, 2 and 3. Anionic polymers may be precipitated, and polymer dispersions may be prepared, at pH ranging from about 2 to about 12, preferably from about 4 to about 10, more preferably from about 5 to about 9. Methods for measuring pH are well known to those skilled in the art.

Routine experimentation used to identify a combination of cationic organic salt, kosmotropic salt, temperature and pH that will precipitate a particular concentration of a particular anionic water soluble polymer may be carried out in a number of ways. One way is by the cloud point technique described above. For instance, to determine the cloud points of 1% poly(AMMPS) one could prepare 30 samples of 1% aqueous poly(AMMPS), each containing either 0%, 5%, 10%, 15%, or 20% ammonium sulfate, and either 0%, 0.02% 0.04%, 0.06% 0.08% or 0.1% cetylpyridinium chloride, in all combinations, at a particular pH. The cloud points of each solution might then be determined by heating each sample to dissolve the polymer, then cooling until the solution turned cloudy. The cloudiness would indicate precipitation, and the temperature at which it occurred would be the cloud point. The process could be repeated for any other polymer, polymer concentration, pH, or salts. Typically, some of the samples would remain clear, even down to 0° C. or below, whereas other would remain cloudy on heating, even to 100° C. or above. Although one would not obtain cloud point information from these samples, one would know the phase behavior of the particular polymer for that particular salt system. In cases when precipitation was observed on heating, and the polymer dissolved on cooling, the cloud points might be determined by cooling the mixtures until the polymers dissolved, then heating to precipitate the polymer. In these cases, the cloud points would be the temperatures at which cloudiness was observed on heating.

Cloud points need not be determined to obtain solubility information. For instance, one could prepare a series of solutions containing various amounts of cationic organic and kosmotropic salt, at a particular pH, and then add a polymer solution to each salt solution. The polymer would either precipitate or remain soluble, as determined by simple visual inspection, and the solubility behavior of the polymer could be correlated with the type and concentration of each salt.

Another routine experimental process for identifying a combination of salts and temperature that will precipitate a particular anionic polymer is to polymerize the monomers in the salt solution, then determine the cloud points. The technique is preferred at high concentrations of polymer, because concentrated solutions of polymers, e.g. 10% or greater, may be difficult to manipulate e.g. stir. The process is similar to the cloud point process in that one might make a series of salt solutions into which the monomer or monomers would be dissolved at concentrations necessary to provide the desired concentration of polymer. The solutions might then be polymerized in a known manner, e.g. sparged with inert gas such as nitrogen, then polymerization initiated by a conventional free radical initiator, to form mixtures of the polymers and salts.

The routine experimental process for identifying a combination of salts and temperature that will not dissolve particular substantially dry, water-soluble polymer powders or granules is similar to the process described above. One might also make a series of salt solutions as above, then add dry polymer to give a composition with the desired concentration of polymer. The mixtures might then be stirred and heated to effect dissolution of the polymer. Information could then be obtained, by direct observation, as to whether the polymer dissolved or did not dissolve in any particular solution; and temperature dependent phase behavior information could be obtained from those solutions which displayed a cloud point as described above.

The precipitated polymer may be recovered from the salt solution by any means known in the art, including filtration, centrifugation, evaporation, spray drying, combinations thereof, etc. The recovered polymer granules typically contain anionic water-soluble polymer, residual salts, optionally residual dispersant, and water. Preferably, the resulting polymer granules contain less than about 30% water, more preferably from about 0.1% to about 20%, most preferably from about 1% to about 15%. Substantially dry, free flowing polymer granules are preferred for handling purposes. Various pH adjusting agents, flow control agents, preservatives, particles size control agents, etc. that are known to those skilled in the art may be added, at any stage of the process, to give substantially dry granules containing anionic water-soluble polymer.

The compositions and processes of this invention provide water-soluble anionic polymers that are useful in a number of applications e.g. the flocculation of suspended solids, recovery of minerals from mining operations, papermaking, enhanced oil recovery, treatment of refinery waste, treatment of food waste, etc. Preferred applications are for dewatering dispersions of suspended minerals and dispersions of suspended cellulosic or paper solids, for deinking paper, and for dewatering biological sludges. To be effective in these applications, compositions of precipitated polymer may be added directly to a dispersion of suspended solids to be treated, mixed, and the resultant concentrated dispersion separated by means known in the art such as centrifuge, belt press, filter press, filter, etc. Preferably, the compositions are first diluted into water to form solutions having an anionic polymer concentration of about 0.01 to about 10%, preferably about 0.05 to about 5%, more preferably about 0.1 to about 3%. The dilute polymer solution may then be mixed in a known manner with the dispersion of suspended solids to be treated, and the resultant concentrated dispersion separated as above. It is known to those skilled in the art that the amount of dilute polymer solution effective for a particular application may be found through routine experimentation.

Substantially dry polymer granules and polymer dispersions are preferred because the small granule or droplet size of the polymer encourages the polymer to dissolve more quickly on dilution. It is believed that the polymer dissolves, in spite of the presence of the salts which tend to precipitate it, because the salt concentration is reduced from the effective range to a range that allows for the polymer to dissolve, by dilution.

A particularly preferred application for the water-soluble anionic polymers of the instant invention is soil conditioning e.g. for the prevention of soil erosion. The process of irrigating a field may tend to cause the detrimental loss of valuable topsoil by erosion. Soil may be stabilized against erosion, particularly in situations wherein the soil is irrigated, by a process which comprises mixing (a) a soil-conditioning amount of an aqueous composition comprised of one or more cationic organic salts, one or more kosmotropic salts, and a precipitated anionic water-soluble polymer or mixture thereof, (b) water, and (c) soil. The addition of the polymer to the soil in a soil-conditioning amount tends to produce greater cohesiveness between the particles of soil, so that the soil is stabilized against erosion by wind, water, etc. Preferably, the composition is dissolved in water to form a conditioning solution, which may then be applied to the soil, preferably in addition to the water typically used to irrigate a field. The concentration of the polymer in the conditioning solution is generally from about 0.1 part per million of solution (ppm) to about 500 ppm, preferably from about 1 ppm to about 100 ppm, more preferably from about 5 ppm to about 50 ppm.

Soil-conditioning amounts of the compositions of the instant invention may be determined by actual field trials or by laboratory testing. For instance, to determine the amount of precipitated anionic polymer composition useful for conditioning a particular soil, the composition could first dissolved in water to form a conditioning solution. Next, various amounts of the conditioning solution could be stirred with various amounts soil and water in a series of containers, then allowed to settle. The turbidity of each supernatant could then be assessed visually or, preferably, by the use of a turbidity meter. The turbidity of the supernatant in each container is typically a good indicator of the efficacy of the polymer and polymer dose for conditioning soil. For instance, a high turbidity value, e.g. greater than 500 nephelometric turbidity units (ntu), may indicate that the polymer or polymer dose will likely not be particularly effective for conditioning that particular soil, whereas a low turbidity value e.g. less than 25 ntu may indicate that the polymer and polymer dose are likely to be effective for conditioning that particular soil. The information gained from these laboratory tests is useful for determining soil-conditioning amounts of the compositions of the instant invention.

Alternatively, and less preferably, polymer dispersions or substantially dry polymer may be applied directly to the soil. In these cases, the polymer may form a conditioning solution when combined with water already present in the soil, or by the subsequent application of water to dissolve the polymer. In irrigation applications, soil-conditioning amounts generally range from about 0.1 to about 20 pounds of polymer per acre per year, preferably 1 to 10 pounds of polymer per acre per year.

Soil erosion may also take the form of large scale movements of soil e.g landslides, where the soil is not typically irrigated. For instance, the destruction of vegetation on a hillside by e.g fire may leave the underlying soil unstable and prone to movement. In these applications, means other than irrigation, such as spraying, may be used to apply the conditioning solutions. Alternatively, polymer dispersions or dry polymer may be applied directly to the soil. In these cases, the polymer may form a conditioning solution when combined with water already present in the soil, or by the subsequent application of water to dissolve the polymer.

The following examples are set forth for illustration purposes only and are not to be construed as limits on the present invention.

VISCOSITY MEASUREMENTS

Standard viscosity (SV) is the viscosity of a 0.096% solution of water-soluble polymer in 1N sodium chloride at 25° C. The viscosity is measured by a Brookfield LVT viscometer with a UL adapter at 60 rpm. The polymer solution being measured is made by diluting a polymer dispersion or solution to a concentration of 0.2% by stirring with the appropriate amount of deionized water during about twelve hours, and then diluting with the appropriate amounts of deionized water and sodium chloride. The bulk viscosity (BV) of a polymer dispersion is the viscosity of the polymer dispersion as measured by a Brookfield LVT viscometer with spindle #4 at 30 rpm and 25° C.

pH Measurements

The pH measurements were made with a conventional electronic pH meter, Jenco Electronics Microcomputer pH-Vision 6071R equipped with a 3-in-1 electrode, Model 6000E. The pH meter was calibrated with commercial buffer solutions at pH 4.00 and pH 7.01.

Example A

A 50/50 mole percent poly(acrylamide/AMMPS) copolymer was prepared by adding 49.77 parts of 53.88% acrylamide solution, 78.97 parts of 99% 2-acrylamido-2-methyl-propanesulfonic acid, 3.02 parts 5% sodium ethylenediaminetetraacetate (EDTA) (chelating agent), 30.3 parts of 50% NaOH solution, and 563.79 parts deionized water to a suitable vessel equipped with mechanical stirring. The solution was stirred at 30° C., and 1.05 parts ammonium persulfate and 3.5 parts of 30% sodium meta-bisulfite solution were added. The solution was deoxygenated by sparging with nitrogen while raising the temperature to about 50° C. After 10 hours of stirring at 50° C., the viscous polymer solution was allowed to cool to give a 50/50 mole percent poly(acrylamide/AMMPS) solution with a polymer content of about 15% by weight. Part of the polymer solution was diluted in deionized water to give a 2% polymer solution for solubility determination.

Example B

About 12 parts of deionized water was added to a suitable vessel, followed by about 1.5 parts of a 2% solution of BTEAC. About 1.5 parts of a 2% solution of a 50/50 mole percent poly(acrylamide/AMMPS) prepared as in Example A was added with stirring to give a clear solution. The pH was adjusted to about 4.6 by adding dilute hydrochloric acid. The solution remained clear, demonstrating that 0.2% 50/50 poly(acrylamide/AMMPS) was not precipitated in a 0.2% solution of BTEAC.

Example C

About 9.26 parts of deionized water was added to a suitable vessel, followed by about 4.24 parts of 99.1% ammonium sulfate and about 1.5 parts of 2% BTEAC; the mixture was stirred to dissolve the salt. A clear solution with a pH of about 4.6 resulted, demonstrating that 0.2% BTEAC was not precipitated in a 28% ammonium sulfate solution.

Example D

About 9.26 parts of deionized water was added to a suitable vessel, followed by about 4.24 parts of 99.1% ammonium sulfate; the mixture was stirred to dissolve the salt. About 1.5 parts of a 2% solution of a 50/50 mole percent poly(acrylamide/AMMPS) prepared as in Example A was added with stirring to give a cloudy mixture with a pH of about 4.6. The mixture was heated with stirring until it became clear, then allowed to cool slowly. The solution became cloudy at 42° C., demonstrating that 0.2% 50/50 poly(acrylamide/AMMPS) had a cloud point of 42° C. in 28% ammonium sulfate solution.

Example 1

About 7.76 parts of deionized water was added to a suitable vessel, followed by about 4.24 parts of 99.1% ammonium sulfate; the mixture was stirred to dissolve the salt. About 1.5 parts 2% BTEAC was added with stirring to give a clear solution. About 1.5 parts of a 2% solution of a 50/50 mole percent poly(acrylamide/AMMPS) prepared as in Example A was added with stirring to give a cloudy mixture with a pH of about 4.6. The mixture was heated with stirring up to a temperature of about 105° C. without dissolving the precipitated polymer. This result demonstrates that 0.2% 50/50 poly(acrylamide/AMMPS) had a cloud point greater than 105° C. in a solution of 28% ammonium sulfate and 0.2% BTEAC. The cloud point of the polymer was higher in a mixture of 28% ammonium sulfate and 0.2% BTEAC than in 28% ammonium sulfate alone (Example D) or 0.2% BTEAC alone (Example B).

Example E

About 12 parts of deionized water was added to a suitable vessel, followed by about 1.5 parts of a 2% solution of BTEAC. About 1.5 parts of a 2% solution of a 50/50 mole percent poly(acrylamide/AMMPS) prepared as in Example A was added with stirring to give a clear solution. The pH was adjusted to about 8.5 by adding NaOH solution. The solution remained clear, demonstrating that 0.2% 50/50 poly(acrylamide/AMMPS) was not precipitated in a 0.2% solution of BTEAC at pH 8.5.

Example F

About 9.26 parts of deionized water was added to a suitable vessel, followed by about 4.24 parts of 99.1% ammonium sulfate and about 1.5 parts of 2% BTEAC; the mixture was stirred to dissolve the salt. The resulting clear solution remained clear after adjusting the pH to about 8.5 by adding NaOH solution, demonstrating that 0.2% BTEAC was not precipitated in a 28% ammonium sulfate solution at pH 8.5.

Example G

About 9.26 parts of deionized water was added to a suitable vessel, followed by about 4.24 parts of 99.1% ammonium sulfate; the mixture was stirred to dissolve the salt. About 1.5 parts of a 2% solution of a 50/50 mole percent poly(acrylamide/AMMPS) prepared as in Example A was added with stirring to give a cloudy mixture with a pH of about 4.6. The pH was adjusted to 8.5 by adding NaOH solution. The mixture was heated with stirring until it became clear, then allowed to cool slowly. The solution became cloudy at 33° C., demonstrating that 0.2% 50/50 poly(acrylamide/AMMPS) had a cloud point of 33° C. in 28% ammonium sulfate solution at pH 8.5, versus 42° C. at pH 4.5 (Example D)

Example 2

About 7.76 parts of deionized water was added to a suitable vessel, followed by about 4.24 parts of 99.1% ammonium sulfate; the mixture was stirred to dissolve the salt. About 1.5 parts 2% BTEAC was added with stirring to give a clear solution. About 1.5 parts of a 2% solution of a 50/50 mole percent poly(acrylamide/AMMPS) prepared as in Example A was added with stirring to give a cloudy mixture with a pH of about 4.6. The pH was adjusted to 8.5 by adding NaOH solution. The mixture was heated with stirring up to a temperature of about 105° C. without dissolving the precipitated polymer. This result demonstrates that 0.2% 50/50 poly(acrylamide/AMMPS) had a cloud point greater than 105° C. in a solution of 28% ammonium sulfate and 0.2% BTEAC, even at a pH of about 8.5. The cloud point of the polymer was higher in a mixture of 28% ammonium sulfate and 0.2% BTEAC than in 28% ammonium sulfate alone (Example G) or 0.2% BTEAC alone (Example E).

Example H

About 12 parts of deionized water was added to a suitable vessel, followed by about 1.5 parts of a 2% solution of BTEAC. About 1.5 parts of a 2% solution of a 50/50 mole percent poly(acrylamide/AMMPS) prepared as in Example A was added with stirring to give a clear solution. The pH was adjusted to about 6.4 by adding NaOH solution. The solution remained clear, demonstrating that 0.2% 50/50 poly(acrylamide/AMMPS) was not precipitated in a 0.2% solution of BTEAC at pH 6.4.

Example I

About 9.26 parts of deionized water was added to a suitable vessel, followed by about 4.24 parts of 99.1% ammonium sulfate and about 1.5 parts of 2% BTEAC; the mixture was stirred to dissolve the salt. The resulting clear solution remained clear after adjusting the pH to about 6.4 by adding NaOH solution, demonstrating that 0.2% BTEAC was not precipitated in a 28% ammonium sulfate solution at pH 6.4.

Example J

About 9.26 parts of deionized water was added to a suitable vessel, followed by about 4.24 parts of 99.1% ammonium sulfate; the mixture was stirred to dissolve the salt. About 1.5 parts of a 2% solution of a 50/50 mole percent poly(acrylamide/AMMPS) prepared as in Example A was added with stirring to give a cloudy mixture with a pH of about 4.6. The pH was adjusted to 6.4 by adding NaOH solution. The mixture was heated with stirring until it became clear, then allowed to cool slowly. The solution became cloudy at 39° C., demonstrating that 0.2% 50/50 poly(acrylamide/AMMPS) had a cloud point of 39° C. in 28% ammonium sulfate solution at pH 6.4, versus 42° C. at pH 4.5 (Example D) and 33° C. at pH 8.5 (Example G).

Example 3

About 7.76 parts of deionized water was added to a suitable vessel, followed by about 4.24 parts of 99.1% ammonium sulfate; the mixture was stirred to dissolve the salt. About 1.5 parts 2% BTEAC was added with stirring to give a clear solution. About 1.5 parts of a 2% solution of a 50/50 mole percent poly(acrylamide/AMMPS) prepared as in Example A was added with stirring to give a cloudy mixture with a pH of about 4.6. The pH was adjusted to 6.4 by adding NaOH solution. The mixture was heated with stirring up to a temperature of about 105° C. without dissolving the precipitated polymer. This result demonstrates that 0.2% 50/50 poly(acrylamide/AMMPS) had a cloud point greater than 105° C. in a solution of 28% ammonium sulfate and 0.2% BTEAC, even at a pH of about 6.4. The cloud point of the polymer was higher in a mixture of 28% ammonium sulfate and 0.2% BTEAC than in 28% ammonium sulfate alone (Example J) or 0.2% BTEAC alone (Example H).

Example 4

A copolymer of 22.5 mole % acrylic acid and 77.5% acrylamide was prepared in the form of a polymer dispersion at a pH of 4.3 as follows: About 1.97 parts of 98% CPC, 48.41 parts 53.88% acrylamide, 7.75 parts 99% acrylic acid, 60.38 parts 99% ammonium sulfate, 2.98 parts 5% sodium ethylenediaminetetraacetate (EDTA) (chelating agent), 4.01 parts of 28% NH$_4$OH solution, and 60.38 parts deionized water were added to a suitable vessel equipped with mechanical stirring. The mixture was stirred to form a clear solution. About 0.51 parts ammonium persulfate was added, followed by 73.6 parts of 15% poly(2-acrylamido-2-methylpropanesulfonic acid) (a dispersant purchased commercially) to give a milky white mixture with a pH of 3.2. About 3.04 parts of 28% $NH_4OH$ solution was added to raise the pH to 4.3. The mixture was deoxygenated by sparging with nitrogen for thirty minutes, while the temperature was raised to about 50° C. About 5 parts of 20% sodium metabisulfite solution was added over the course of 20 minutes. The reaction was stirred at 50° C. for about 5 hours, then allowed to cool. The resulting polymer dispersion had a bulk viscosity of about 5100 centipoise and a pH of about 4.2. The standard viscosity of the polymer was about 4.2 centipoise, indicating high molecular weight.

Example K

A copolymer of 22.5 mole % acrylic acid and 77.5% acrylamide was prepared at a pH of 4.3 as in Example 4, except that 73.6 parts of deionized water were added to the mixture in place of the dispersant, 73.6 parts of 15% poly(2-acrylamido-2-methyl-propanesulfonic acid). Instead of forming a low viscosity dispersion, the polymer precipitated in the form of a gelatinous white mass that could not be stirred.

Example 5

A conditioning solution was prepared by diluting a dispersion prepared as in Example 4 with deionized water so that the concentration of the dissolved polymer in the resulting conditioning solution was 0.1%. About 3 parts of soil were added to a separate vessel containing 100 parts of deionized water, the mixture was stirred vigorously, and 1.0 parts of the conditioning solution were added. The resulting mixture was agitated for 15 minutes, then allowed to settle for 15 minutes. The turbidity of the supernatant was about 11±5 ntu, as measured with a hand-held turbidity meter, indicating that this composition is likely to be useful for conditioning soil.

Example L

Example 5 was repeated, except that deionized water was used in place of the conditioning solution. The turbidity of the supernatant was greater than 1000 ntu.

Example M

Example 5 was repeated, except that the conditioning solution contained a commercially available copolymer of acrylamide and acrylic acid, known to be useful for conditioning soil, instead of a polymer prepared as in Example 4. The turbidity of the supernatant was 8.1±5 ntu.

We claim:

1. A process of concentrating a dispersion of suspended solids which comprises dewatering a dispersion of suspended solids by adding to said dispersion an effective amount of an aqueous composition, or solution thereof, comprised of at least one cationic organic salt, at least one kosmotropic salt, and at least one precipitated anionic water-soluble polymer, and separating the resultant concentrated dispersion, wherein said salts are used in amounts effective to precipitate said polymer.

2. A process as claimed in claim 1 wherein said cationic organic salt is selected from the group consisting of tetraalkylammonium halides having from 4 to 22 carbon atoms, substituted tetraalkylammonium halides having from 4 to 22 carbon atoms, aryl trialkylammonium halides having from 9 to 22 carbon atoms, and substituted aryl trialkylammonium halides having from 9 to 22 carbon atoms.

3. A process as claimed in claim 1 wherein said precipitated anionic water-soluble polymer contains recurring units having anionic groups selected from the group consisting of carboxylic acid, carboxylic acid salt, sulfonic acid, and sulfonic acid salt.

4. A process as claimed in claim 3 wherein said precipitated anionic water-soluble polymer further contains recurring (meth)acrylamide units.

5. A process as claimed in claim 1 wherein some or all of said precipitated anionic water-soluble polymer is precipitated as a polymer dispersion.

6. A process as claimed in claim 5 wherein said aqueous composition is further comprised of a water-soluble polymer dispersant different from said precipitated anionic water-soluble polymer, and wherein said dispersant is used in amounts which do not cause the precipitation of said anionic water-soluble polymer in the absence of said salts.

7. A process as claimed in claim 1 wherein said aqueous composition contains water in an amount of from 0.1% to 20%, by weight, based on total weight.

8. A process as claimed in claim 1 wherein said dispersion of suspended solids comprises paper waste, mineral suspensions, food waste, or a biologically treated suspension.

9. A process of concentrating a dispersion of suspended solids which comprises dewatering a dispersion of suspended paper solids or suspended mineral solids by adding to said dispersion an effective amount of an aqueous composition comprised of a precipitated anionic water-soluble polymer, from 0.02 to 12%, by weight based on total weight, of a tetraalkylammonium salt and from 0.1% to 30%, by weight based on total weight, of a sulfate salt, and separating the resultant concentrated dispersion, wherein said precipitated anionic water-soluble polymer is comprised of recurring units that contain sulfonic acid, sulfonic acid salt, carboxylic acid or carboxylic acid salt groups, and wherein said tetraalkylammonium salt and said sulfate salt are used in amounts effective to precipitate said polymer.

10. The process as claimed in claim 9 which further comprises first dissolving said composition in water before adding to said dispersion.

* * * * *